(12) United States Patent
Walter et al.

(10) Patent No.: US 8,026,964 B2
(45) Date of Patent: Sep. 27, 2011

(54) METHOD AND APPARATUS FOR CORRECTING DEFECTIVE IMAGER PIXELS

(75) Inventors: Nathan Walter, Tigard, OR (US); Sachin Datar, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 588 days.

(21) Appl. No.: 12/216,573

(22) Filed: Jul. 8, 2008

(65) Prior Publication Data

US 2010/0007777 A1 Jan. 14, 2010

(51) Int. Cl.
*H04N 9/64* (2006.01)
*H04N 5/235* (2006.01)
*H04N 5/238* (2006.01)

(52) U.S. Cl. ......... 348/246; 348/247; 348/362; 348/364

(58) Field of Classification Search .................. None
See application file for complete search history.

(56) References Cited

U.S. PATENT DOCUMENTS

| | | | |
|---|---|---|---|
| 6,480,627 B1 | 11/2002 | Mathias et al. | |
| 6,504,572 B2 | 1/2003 | Kramer et al. | |
| 6,529,622 B1 | 3/2003 | Pourjavid | |
| 6,618,084 B1 | 9/2003 | Rambaldi et al. | |
| 7,009,644 B1 | 3/2006 | Sanchez et al. | |
| 7,133,072 B2 * | 11/2006 | Harada | 348/243 |
| 7,154,547 B2 * | 12/2006 | Oda | 348/277 |
| 7,202,894 B2 | 4/2007 | Kaplinsky et al. | |
| 7,209,168 B2 | 4/2007 | Post | |
| 7,742,086 B2 * | 6/2010 | Kadohara | 348/247 |
| 2002/0015111 A1 * | 2/2002 | Harada | 348/642 |
| 2005/0280722 A1 * | 12/2005 | Kadohara | 348/231.99 |
| 2006/0044425 A1 | 3/2006 | Yeung et al. | |
| 2007/0101194 A1 | 5/2007 | Lockwood et al. | |

OTHER PUBLICATIONS

A solder joint inspection system for automated printed circuit board manufacturing (Jong-Seok Park and Julius T. Tou—Center for Information Research, University of Florida, Gainesville, FL 32611) Disclosure #2007-0591.

* cited by examiner

*Primary Examiner* — Lin Ye
*Assistant Examiner* — John H Morehead, III
(74) *Attorney, Agent, or Firm* — Jason Tsai (57) ABSTRACT

A method and apparatus for correcting defective pixel signals, wherein pixel signals are corrected in accordance with correction information associated with operating conditions under which an image is acquired. A method for acquiring and storing correction information in an imager device is also provided.

14 Claims, 6 Drawing Sheets

| CONDITION TESTING RESULTS |||| |
|---|---|---|---|---|
| Pixel Address | Testing Results |||  |
| (x,y) | Exposure Condition | Defective Pixel Signal? | Defective Pixel Cluster? | ~490 |
| 0,0 | A | No | No | |
| 0,0 | B | No | No | |
| 1,0 | A | Yes | Yes | |
| 1,0 | B | No | No | |
| 2,0 | A | Yes | Yes | |
| 2,0 | B | Yes | No | |
| 0,1 | A | Yes | Yes | |
| 0,1 | B | Yes | No | |
| 1,1 | A | Yes | Yes | |
| 1,1 | B | No | No | |
| 2,1 | A | Yes | Yes | |
| 2,1 | B | No | No | |

FIG.4A

| Conditional Correction Template ||
|---|---|
| 00 | Never Repair |
| 01 | Repair Only When A |
| 10 | Repair Only When B |
| 11 | Always Repair |

492

| Correction Scheme Template ||
|---|---|
| 00 | Always Average |
| 01 | Average for Condition A, Else Copy |
| 10 | Copy for Condition B, Else Average |
| 11 | Always Copy |

| PIXEL CORRECTION INFORMATION |||| |
|---|---|---|---|---|
| Pixel Address Data 232 || Pixel Conditional Correction Data 234 || ~496 |
| (y) | (x) | Cond. | Scheme | |
| 00 | 00 | 00 | 00 | |
| 00 | 01 | 01 | 11 | |
| 00 | 10 | 10 | 01 | |
| 01 | 00 | 11 | 01 | |
| 01 | 01 | 01 | 01 | |
| 01 | 10 | 01 | 01 | |

FIG. 6

METHOD AND APPARATUS FOR CORRECTING DEFECTIVE IMAGER PIXELS

FIELD OF THE INVENTION

The embodiments described herein relate generally to the field of digital imaging, and more specifically to methods and apparatuses for correcting defective pixel signals from an imager device.

BACKGROUND

Microelectronic imager devices are used in digital cameras, wireless devices with picture capabilities, and many other applications. Cellular telephones, personal digital assistants (PDAs), computers, and stand alone cameras, for example, are incorporating microelectronic imager devices for capturing and sending pictures. The growth rate of microelectronic imager devices has been steadily increasing as they become smaller and produce better images having higher pixel counts.

Microelectronic imager devices include image sensors that use charged coupled device (CCD) systems, complementary metal-oxide semiconductor (CMOS) systems or other imager technology. CCD image sensors have been widely used in digital cameras and other applications. CMOS image sensors are also popular because they have low production costs, high yields, and small sizes.

In an imager device, a pixel array comprises a plurality of pixels, each containing a photosensitive element, arranged in a predetermined number of columns and rows. The pixels are used to receive and store light. Each pixel in the array typically has an individual assigned address. The pixels of a pixel array generate signals representing incident light, which are then digitized and processed to produce image data.

One or more pixels in a pixel array may be defective, generating an inaccurate pixel signal. This inaccurate pixel signal can cause distortion or other undesirable effects in the image generated from the pixel signal. Defective pixels can be identified and corrected dynamically by using an image processor that identifies whether a pixel signal indicates a defective pixel by comparing the pixel signal to those output by neighboring pixels or to some threshold value, and, if so, replacing the pixel signal with a new value computed by the processor.

While this dynamic method can alleviate the undesirable effect of single defective pixels in an imager array without noticeable degradation of the image, when multiple neighboring pixels are defective, the image processor may not be able to compare all of the neighboring pixels and accurately determine whether certain pixels are defective. Multiple neighboring defective pixels are commonly known as a defective "cluster." Algorithms exist which are designed to dynamically correct defective clusters; typically, however, image degradation is a very noticeable end result. Particularly, dynamic correction is not desirable when pixels in the cluster exhibit defects in the same color plane.

For this reason, pixel signals may also be corrected using a memory-based correction scheme. Defective pixels are identified during the-manufacturing of the imager device, and their addresses stored in programmable memory of a correction circuit, such as, e.g., a fuse bank. Once the addresses of the defective pixels are stored, a correction scheme can be applied to the signals generated by these pixels. Examples of correction schemes may include interpolation of neighboring pixel signals, substituting the median value of neighboring pixel signals, or copying of a neighboring pixel's signal.

As pixel array designs become more complex, however, so do the effects of defective clusters. For example, defective clusters may form in groups which are difficult to correct, such as a group of four defective pixels with one pixel in each quadrant surrounding a non-defective pixel. Defective clusters are also becoming larger. Correction schemes applied to large defective clusters are more likely to cause visible distortion in an image.

Figure 1:
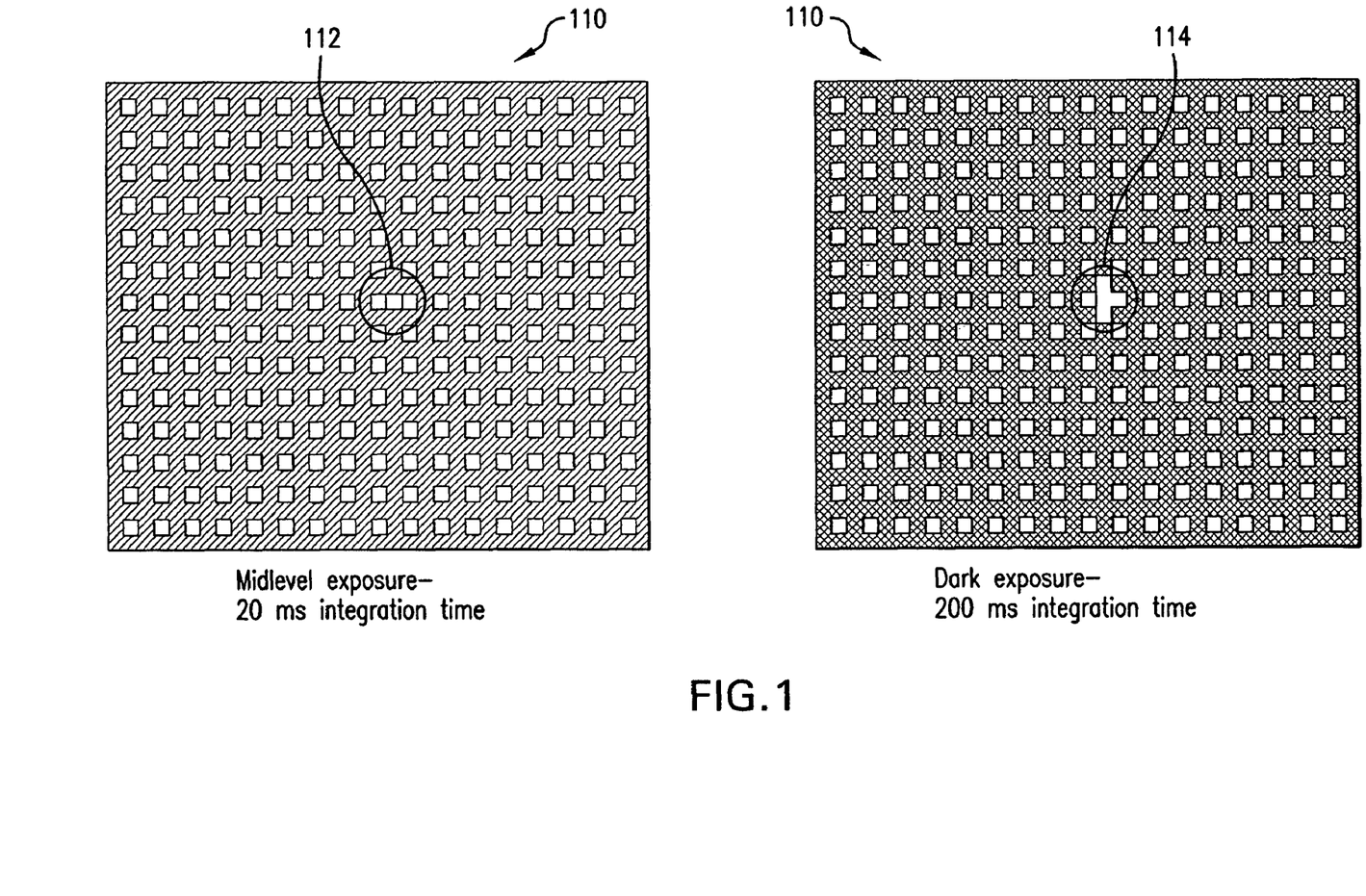
FIG. 1 illustrates visible defective pixels in a pixel array, in respective midlevel and dark exposure conditions.

With current memory-based correction schemes, all pixel signals from pixels identified as defective are corrected for every image capture, regardless of the exposure conditions of the particular image. Defective clusters, however, may be noticeable under certain exposure conditions but not noticeable under others. For example, under low-light exposure conditions, a plurality of pixels in an area may produce defective signals, forming a noticeable defective cluster; whereas under midlevel-light conditions, only a single defective pixel signal or no defective pixel signal at all may be produced. FIG. 1 shows an example of a pixel array 110 under both midlevel (e.g., 20 ms integration time) and dark (e.g., 200 ms integration time) exposure conditions. Under the midlevel exposure condition, only a single pixel 112 in the pixel array produces inaccurate output. Under the darker exposure condition, however, a defective cluster 114 is visible.

Currently, the same correction would be applied to the pixel signals in the array, regardless of the exposure conditions. When correction is not necessary, applying a correction scheme can unnecessarily cause the undesirable image degradation described above. Further, some correction schemes may be more appropriate for certain exposure conditions. Accordingly, there is a need and desire to determine whether or not to correct a pixel based upon existing operating or exposure conditions of an imager device, and to determine which correction scheme to apply.

DETAILED DESCRIPTION OF THE INVENTION

In the following detailed description, reference is made to the accompanying drawings which form a part hereof, and in which are shown by way of illustration specific embodiments that may be practiced. It should be understood that like reference numbers represent like elements throughout the drawings. These example embodiments are described in sufficient detail to enable those skilled in the art to practice them. It is to be understood that other embodiments may be utilized, and that structural and electrical changes may be made, only some of which are discussed in detail below.

Figure 2:
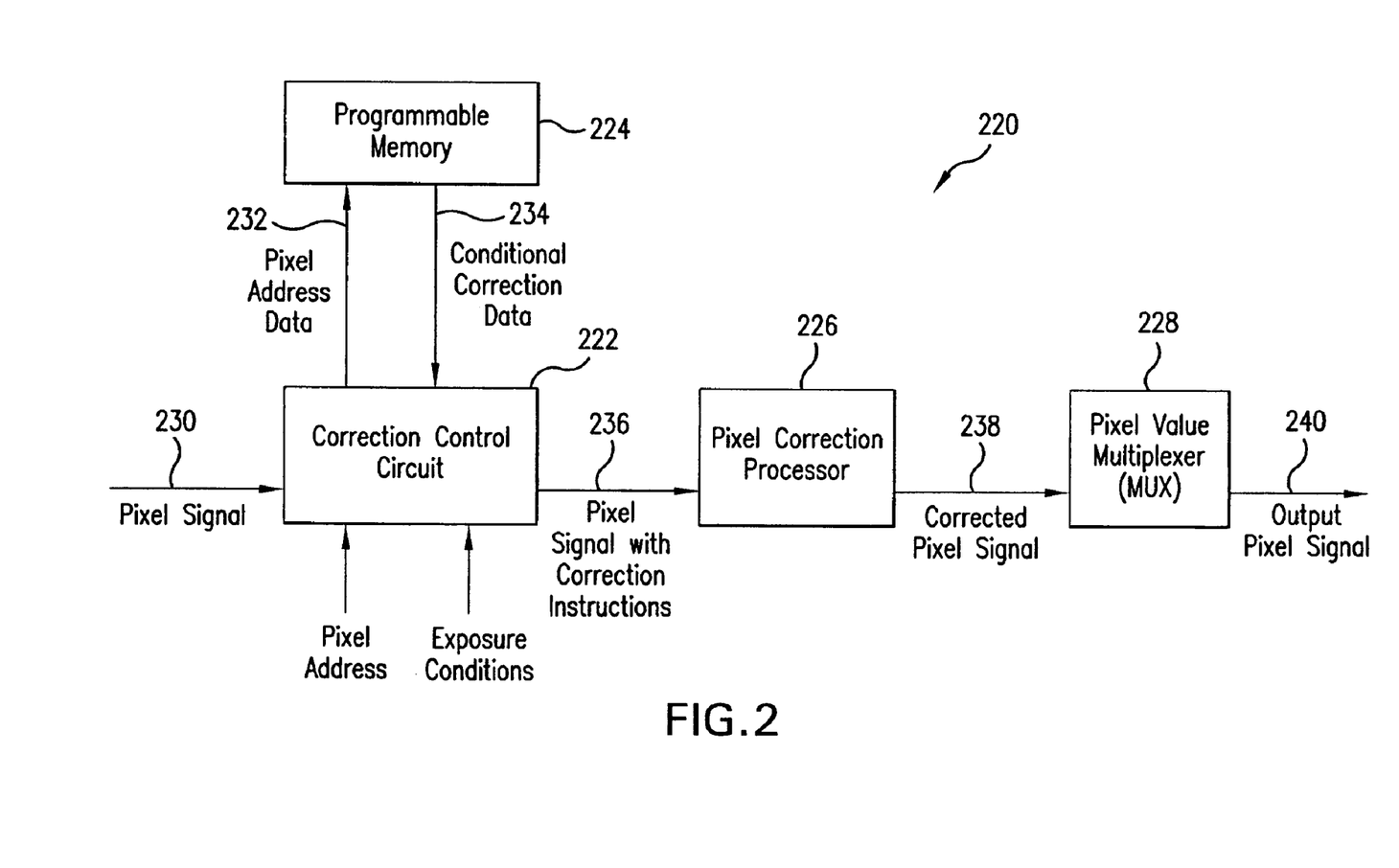
FIG. 2 is a block diagram of a conditional pixel defect correction circuit, in accordance with an embodiment described herein.

FIG. 2 is a block diagram of a conditional pixel defect correction circuit 220, in accordance with an embodiment described herein. The correction circuit 220 includes a correction control circuit 222 electronically coupled to a programmable memory 224. The programmable memory 224 may be any non-volatile storage device, such as, e.g., a fuse bank or flash memory. The programmable memory 224 contains pixel correction information for each of a plurality of pixels in a pixel array connected to the circuit 220, according to different exposure conditions. The pixel correction information has pixel conditional correction data 234 corresponding to each pixel address data 232. The pixel conditional correction data 234 may specify whether correction is to be performed on the associated pixel for each of a plurality of exposure conditions, what types of correction is to be applied, or both.

During a pixel correction operation, a pixel signal 230 is input into the correction control circuit 222. The pixel signal 230 may be from a single pixel or a plurality of pixels. The pixel signal 230 may be input to the correction control circuit 222 after being converted to a digital signal, or may be input and processed by the pixel defect correction circuit 220 as an analog signal. The correction control circuit 222 also receives the pixel address associated with the pixel signal 230, and data specifying the exposure conditions under which the pixel signal 230 was acquired.

The pixel address corresponding to the input pixel signal 230 is communicated to the programmable memory 224. In one embodiment, where the pixel signal is a digital signal, the pixel conditional correction data 234 corresponding to the pixel address may be communicated from the programmable memory 224 to the pixel correction control circuit 222 and appended to the digital pixel signal 230. In this embodiment, any method by which pixel conditional correction data 234 is input to the correction control circuit 222 from the programmable memory 224 may be used. For example, the pixel address input to the correction control circuit 222 may be used to index a table or database comprising corresponding pixel correction information associated with exposure conditions for certain pixel addresses in the programmable memory 224. As another example, after receiving information on the existing exposure conditions, the correction control circuit 222 may search the programmable memory 224 for all pixel conditional correction data 234 entries which specify that correction is needed under the existing exposure conditions. These pixel conditional correction data 234 entries, all associated pixel address data 232 entries, or both may then be temporarily stored in the correction control circuit 222, identifying pixel signals which require correction. Accordingly, the illustrated embodiment is not to be limited to any particular technique for addressing the programmable memory 224 and obtaining the conditional correction data 234.

The correction control circuit 222 associates the pixel signal 230 with correction instructions based on the pixel conditional correction data 234 corresponding to the input exposure conditions by appending the correction instructions to the pixel signal 230. The correction instructions may identify, for example, whether the pixel signal 230 is to be repaired, and, if so, which type of correction is to be applied. The correction instructions are pre-programmed in programmable memory 224 based on desired correction associated with exposure conditions at the time of manufacture of an imager device that contains an associated pixel array.

The pixel signal with associated correction instructions 236 is then input into the pixel correction processor 226, where the pixel signal 230 is corrected according to the correction instructions. Because the determination of whether to apply correction to a pixel signal and the correction schemes specified by the pixel conditional correction data 234 can correspond to different exposure conditions, the correction applied may account for defective clusters apparent in certain exposure conditions which may not be apparent (and thus not require correction) in other exposure conditions.

The corrected pixel signal 238 is output from the pixel correction processor 226. In an embodiment where the conditional pixel defect correction circuit 220 processes and corrects pixel signals 230 from multiple pixels, the multiple pixel signals 230 may be processed as a group within pixel correction processor 226, and the multiple corrected pixel signals 238 may be output to a multiplexer (MUX) 228, which sequences the corrected pixel signals to their proper locations in an image for downstream image processing. In such an embodiment, the multiplexer 228 determines which corrected pixel signal 238 to output to preserve the corrected pixel signal 238 location in the image. The output pixel signal 240 is output to an image processor 448 (FIG. 4), which forms and outputs a digital image. In other embodiments, the multiplexer 228 may be omitted from the conditional pixel defect correction circuit 220, and the corrected pixel signal 238 may be directly output to the image processor 448. In this case, the image processor 448 can correctly reposition the corrected pixel signals 238, if needed, prior to further image processing.

In the embodiment illustrated in FIG. 2, the appropriate pixel conditional correction data 234 is sent to the correction control circuit 222, which sends the pixel signal 230 and any associated correction instructions to the pixel correction processor 226. In another embodiment, the pixel conditional correction data 234 may be communicated directly from the programmable memory 224 to the pixel correction processor 226. In yet another embodiment, the pixel correction processor 226 and the correction control circuit 222 may form part of the same circuit, and both may also be part of the front end circuitry of image processor 448.

The circuit illustrated in FIG. 2 may be implemented as an entirely hardware circuit, or a combination of hardware and programmable circuitry, or as a programmable circuit.

Figure 3:
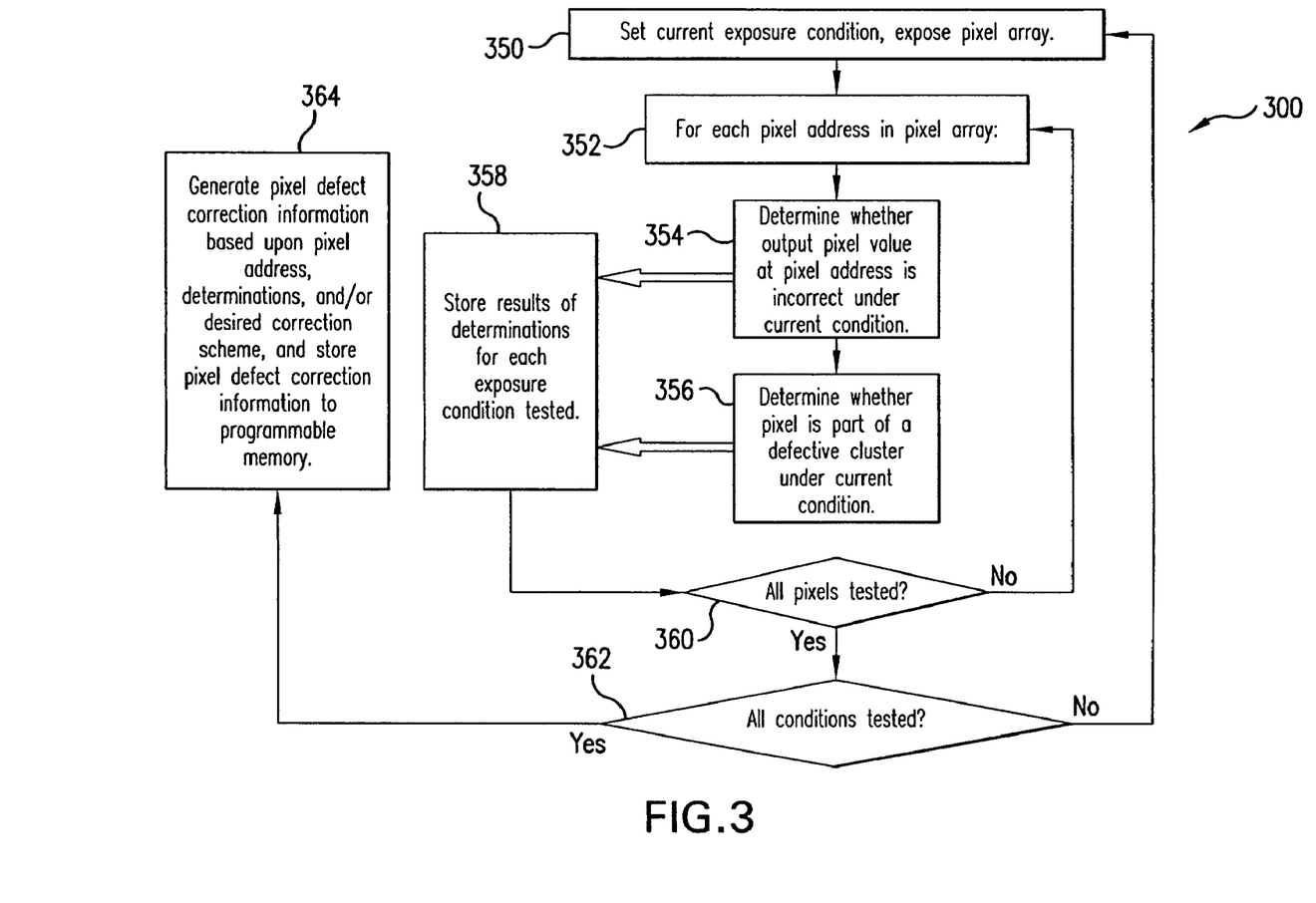
FIG. 3 shows a flowchart of a method for programming the programmable memory of a conditional pixel defect correction circuit

FIG. 3 shows a flowchart of a method 300 for programming the programmable memory 224 in the conditional pixel defect correction circuit 220 described above. The pixel correction information can be programmed to the programmable memory 224 as part of the manufacturing of an imager device 500 (FIG. 5) containing a pixel array 510 and the conditional pixel defect correction circuit 220, with pixel correction information customized for the associated pixel array 510.

Figure 5:
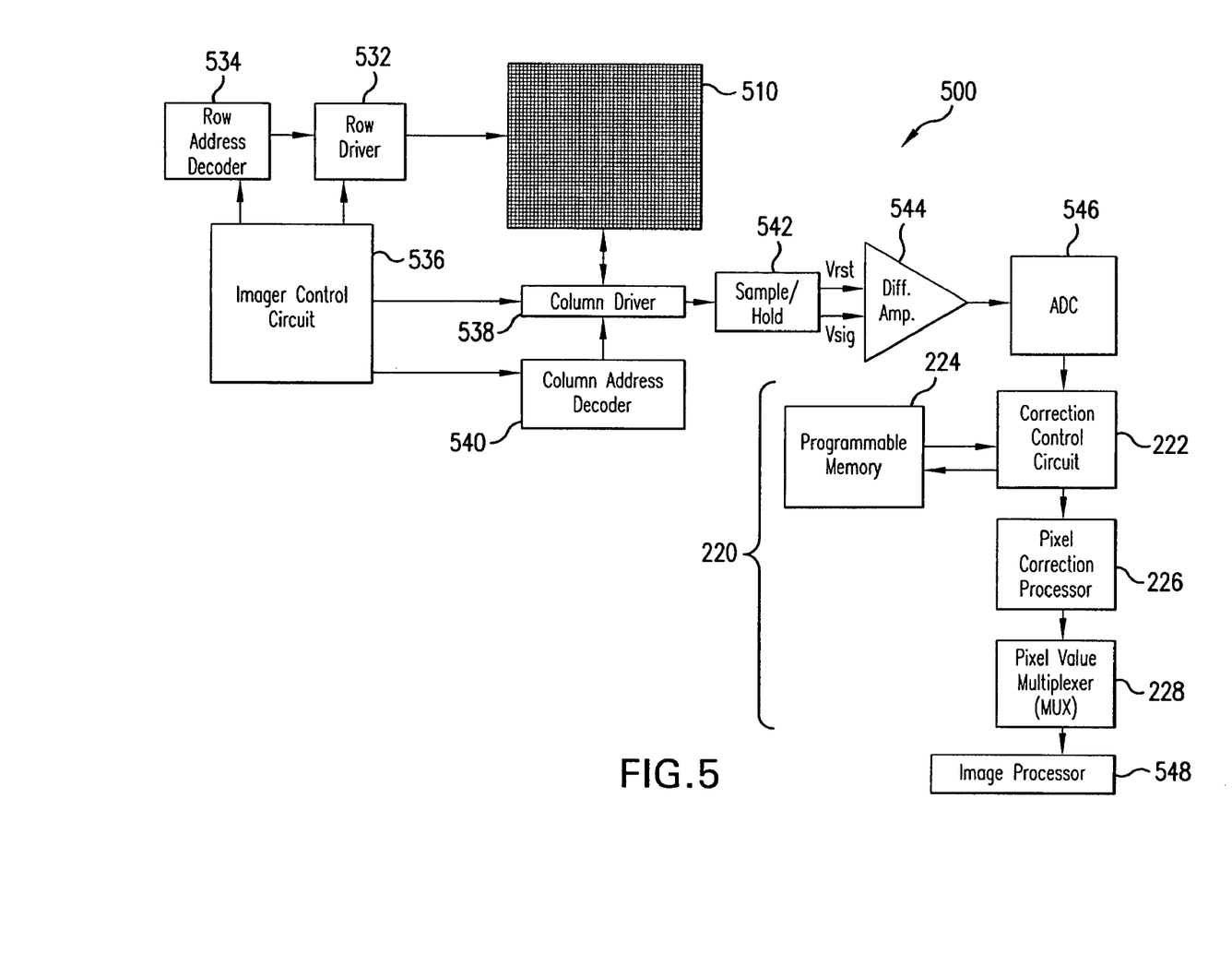
FIG. 5 is a block diagram of an imager device having a conditional pixel defect correction circuit, in accordance with an embodiment described herein.

The method 300 includes a step 350 of setting a desired exposure condition for testing, and exposing pixel array 510 to the exposure condition. Exposure conditions tested may include, but are not limited to, varying levels of scene lumination, varying exposure or integration times, varying levels of gain applied to the analog pixel signals, and varying levels of temperature at time of exposure, or a combination of multiple conditions which may be measured during image exposure.

In step 352, which includes sub-steps 354 and 356, each pixel of pixel array 510 is tested to see if it has any type of defect under the set exposure condition(s). The pixels of pixel array 510 may be tested simultaneously or successively.

Step 352 may include multiple tests for each pixel. These tests may include determining whether the output pixel value is defective under the current condition, as shown in sub-step 354, and/or determining whether the pixel is part of a defective cluster under the current condition, as shown in sub-step 356. Sub-step 356 may determine whether the pixel is part of a defective cluster by testing the surrounding pixels. Alternatively, the determination of whether the pixel is part of a defective cluster under the current condition may be made after all surrounding pixels are tested under the current conditions in subsequent sub-steps 354, and a resulting cluster of surrounding defective pixels may be detected when formulating and storing the pixel conditional correction data 234 in step 364.

It should be appreciated that the determinations performed within step 352 are not limited to the determinations described in sub-step 354 and 356; nor are both sub-steps 354 and 356 necessarily included in programming the programmable memory 224 in the conditional pixel defect correction circuit 220. Accordingly, method 300 may include any tests performed on pixel outputs under various exposure conditions.

At step 358, the results of the determinations in steps 352 and sub-steps 354 and 356 are temporarily stored. These results will later determine the pixel correction information associated with each pixel address in pixel array 510.

Figure 4A:
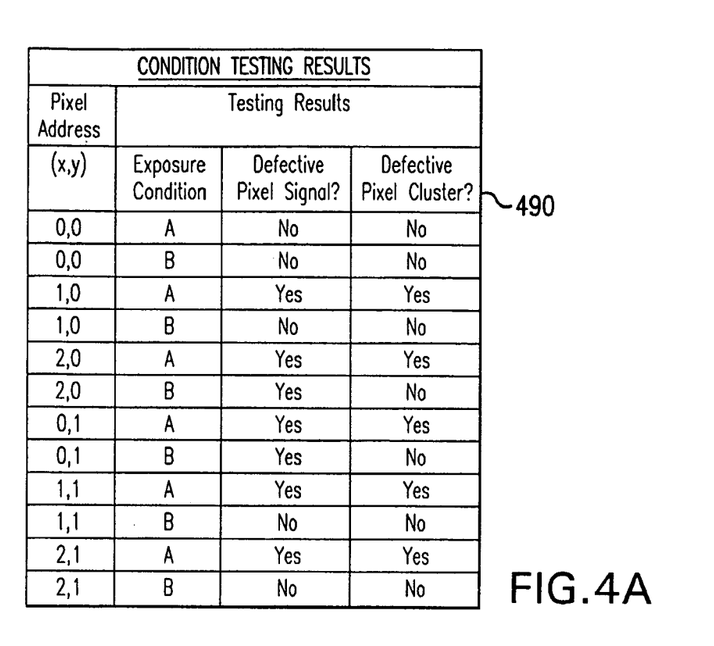
FIG. 4A shows a table illustrating possible results of determining whether pixels in a pixel array are defective under certain exposure conditions.

FIG. 4A shows a table 490 of condition testing results illustrating possible results of testing in accordance with method 300. Table 490 contains results for two rows of three pixels (i.e. a 2×3 pixel array). Results of testing for defective pixel signals under two exposure conditions, A and B, are contained in table 490. The results specify whether each pixel was defective under each tested exposure condition in sub-step 354. The results in table 490 also specify whether each pixel was part of a defective pixel cluster under the tested exposure condition in sub-step 356. In the example results shown in table 490, pixel signals associated with pixel addresses (1,0), (2,0), (1,1), and (2,1) are part of a defective cluster under Exposure Condition A, but not under Exposure Condition B.

Steps 352 through 358 continue until all pixels in the imager array are tested under the current condition, as determined by step 360. If testing of further exposure conditions is desired, as determined by step 362, steps 350 through 360 are then repeated for each pixel address under the further exposure conditions.

After all pixels are tested under all exposure conditions, as determined by step 362, the results stored in step 358 are used to generate pixel correction information in step 364.

The pixel correction information includes the pixel address data 232 of the tested pixel, and pixel conditional correction data 234 indicating whether correction is to be performed under the current condition tested, based on the results stored at step 358. In another embodiment, the pixel correction information may not include pixel address data 232; the pixel correction information may instead be stored in the programmable memory 224 in an order corresponding to the order in which pixels are addressed in the pixel array.

The pixel conditional correction data 234 may also include information specifying the type of correction scheme to be applied under the particular exposure condition tested. For example, the pixel conditional correction data 234 may specify one type of correction scheme, such as interpolation, to be applied to a pixel during one exposure condition, while specifying another type of correction scheme, such as substituting the median value of the signal from a neighboring pixel, during another exposure condition. Correction schemes for different exposure conditions may include replacing the defective pixel with an interpolation of pixel signals from neighboring pixels, the median values of signals from neighboring pixels, or the exact value of signals from neighboring pixels, to name just a few examples. It should be appreciated that any appropriate correction scheme may be used; accordingly, the illustrated embodiment is not to be limited to any particular correction data scheme.

Figure 4B:
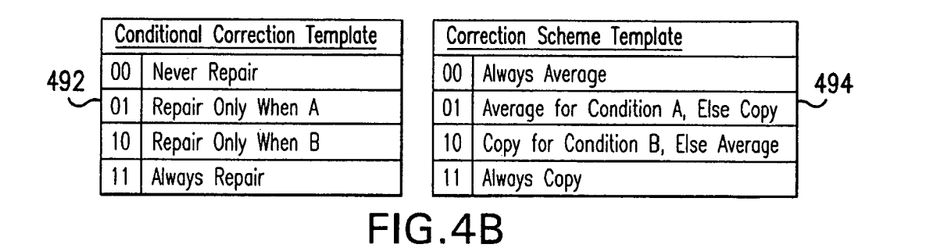
FIG. 4B shows templates for converting testing results into conditional correction information.

FIG. 4B shows an example of conversion templates that can be used for converting the results stored in step 358 into pixel conditional correction data 234 which is formulated and stored in step 364. The condition testing results shown in table 490 are converted, using values like those of the conditional correction template 492, into data specifying exposure conditions under which the pixel signal associated with the corresponding pixel address data 232 is to be corrected. A correction scheme for each exposure condition can also be specified, using the values like those of the correction scheme template 494.

Using the results shown in condition testing table 490 and the conversion templates 492, 494, pixel correction information can be generated and stored in the programmable memory 224 (FIG. 2) of conditional pixel defect: correction circuit 220. The values ultimately selected from the conditional correction template 492 and the correction scheme template 494 may depend upon exposure conditions under which the pixel associated with the corresponding pixel address was defective, exposure conditions under which the pixel was part of a defective pixel cluster, or a combination of both.

Figure 4C:
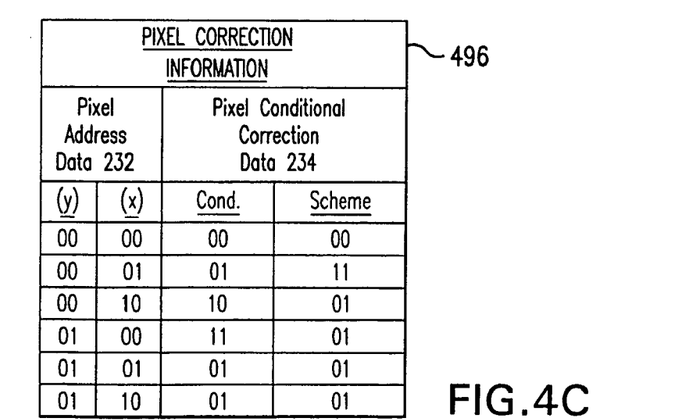
FIG. 4C shows a table of conditional correction data, in accordance with an embodiment described herein.

FIG. 4C shows a sample table 496 of pixel correction information generated from condition testing results 490 and conversion templates 492, 494. The pixel correction information includes pixel address data 232 and pixel conditional correction data 234. In the sample pixel conditional correction data 234 shown in table 496, the pixel conditional correction data 234 specifies that a pixel signal from each corresponding pixel address should be corrected only when the pixel signal is captured under exposure conditions where the corresponding pixel address was determined to be defective.

For example, pixel signals from pixel address (0,0) were not identified in table 490 as outputting a defective pixel signal under either of the two tested exposure conditions, A, B. Thus, in the pixel correction information shown in table 496, pixel signals from pixel address (0,0) are specified as never requiring repair ("00") by the conditional pixel defect correction circuit 220. As another example, pixel signals from pixel address (1,1) were identified in table 490 as outputting a defective pixel signal under exposure condition A, but not under exposure condition B. Thus, in the pixel correction information shown in table 496, pixel signals from pixel address (1,1) are specified as requiring repair only under exposure condition A ("0,1") by the conditional pixel defect correction circuit 220.

The pixel conditional correction data 234 also specifies the correction scheme to apply for either condition. In the sample pixel conditional correction data 234 shown in table 496, the correction scheme specified by the pixel conditional correction data 234 depends on whether or not the corresponding pixel was part of a defective pixel cluster under the associated exposure condition. For example, pixel signals from pixel address (0,1) were identified as outputting defective pixels under both conditions A and B; further, pixel address (0,1) was identified as being part of a defective cluster under condition A, but not under condition B. Thus, in the pixel correction information shown in table 496, pixel signals from pixel address (0,1) are specified as always requiring repair under both exposure conditions A and B ("11"). The pixel correction information further specifies that pixel signals from pixel address (0,1) which are captured under exposure condition A are to be repaired by averaging the values of neighboring pixel signals, while pixel signals from pixel address (0,1) captured under exposure condition B are to be repaired by copying the value of a neighboring pixel signal.

It should be understood that the pixel conditional correction data 234 stored in method 300 need not specify both whether to correct a pixel signal and the type of correction scheme to be applied. Rather, the pixel conditional correction data 234 may specify only whether or not correction should be applied, only what type of correction should be supplied, or some other correction specific to the exposure conditions. Further, the correction scheme specified by the pixel conditional correction data 234 may be selected for reasons other than whether the pixel was part of a defective cluster.

Step 364 of method 300 further includes storing the pixel correction information to the programmable memory 224. Pixel correction information may be written to the programmable memory 224 for all pixels in the imager array. Alternatively, pixel correction information may only be written to the programmable memory 224 for pixels that were determined to be defective under one or more conditions. Any known arrangement for storing the pixel correction information that would allow the conditional pixel defect correction circuit 220 to reference the conditional correction data 234 of pixels needing correction is appropriate for the embodiments discussed above. It should be understood that the pixel correction information for properly operating pixels may specify that no correction is to be applied.

FIG. 5 shows a block diagram of one example of an imager device 500, for example, a CMOS imager device, which may be electronically coupled to or contain a conditional pixel defect correction circuit 220. The imager device 500 example shown has a pixel array 510 comprising a plurality of pixels arranged in a predetermined number of columns and rows. Attached to the pixel array 510 is signal processing circuitry, described herein. The pixels of each row in pixel array 510 are all turned on at the same time by a row select line, and the pixel signals of each activated row are output onto output lines by respective column lines. A plurality of row and column select lines are provided for the entire pixel array 510. The row lines are selectively activated by a row driver 532 in response to row address decoder 534. The column lines may be selectively activated by a column driver 538 in response to column address decoder 540. Thus, a row and column address is provided for each pixel in the pixel array 510.

The imager device 500 is operated by the imager control circuit 536, which controls the address decoders 534, 540 for selecting the appropriate row and column lines for pixel readout. The imager control circuit 536 also controls the row and column drivers 532, 538 such that they apply driving voltages to the drive transistors of the selected row and column select lines. The signals output by the pixels, which for a CMOS imager typically include an analog pixel reset signal (Vrst) and a pixel image signal (Vsig), are read by a sample and hold circuit 542. Vrst is read from a pixel immediately after a charge storage region is reset. Vsig represents the amount of charge generated by the pixel's photosensitive element and stored in the charge storage region in response to applied light. A differential signal of Vrst and Vsig is produced by differential amplifier 544 for each pixel. The differential signal is digitized by analog-to-digital converter (ADC) 546.

The analog-to-digital converter 546 supplies the digitized pixel signal 230 (FIG. 2) to the correction control circuit 222 of the conditional pixel defect correction circuit 220. It should also be understood that while imager device 500 shows the conditional pixel defect correction circuit 220 implemented in the digital domain (i.e. after the analog-to-digital converter 546), it is also possible to perform the corrections on the analog pixel signals output by the pixel array 510 in the analog domain before they are digitized (i.e. before the analog-to-digital converter 546).

After conditional pixel defect correction, as discussed above with reference to FIG. 2, the output pixel signal 240 is output to an image processor 548. In another embodiment, where the conditional pixel defect correction circuit 220 receives and processes pixel signals in the analog domain, the output pixel signal 240 may first be passed through an analog-to-digital converter, before being output to the image processor 548. The image processor 548 forms and outputs a digital image.

The embodiment shown in FIG. 5, showing a CMOS imager implementation, is but one example of an imager device implementing an embodiment of the invention. It should be understood that an embodiment of the conditional pixel defect correction circuit described herein may be appropriate for use with a variety of imager devices, for example, an imager device with a CCD system or any other type of imager device or system.

Figure 6:
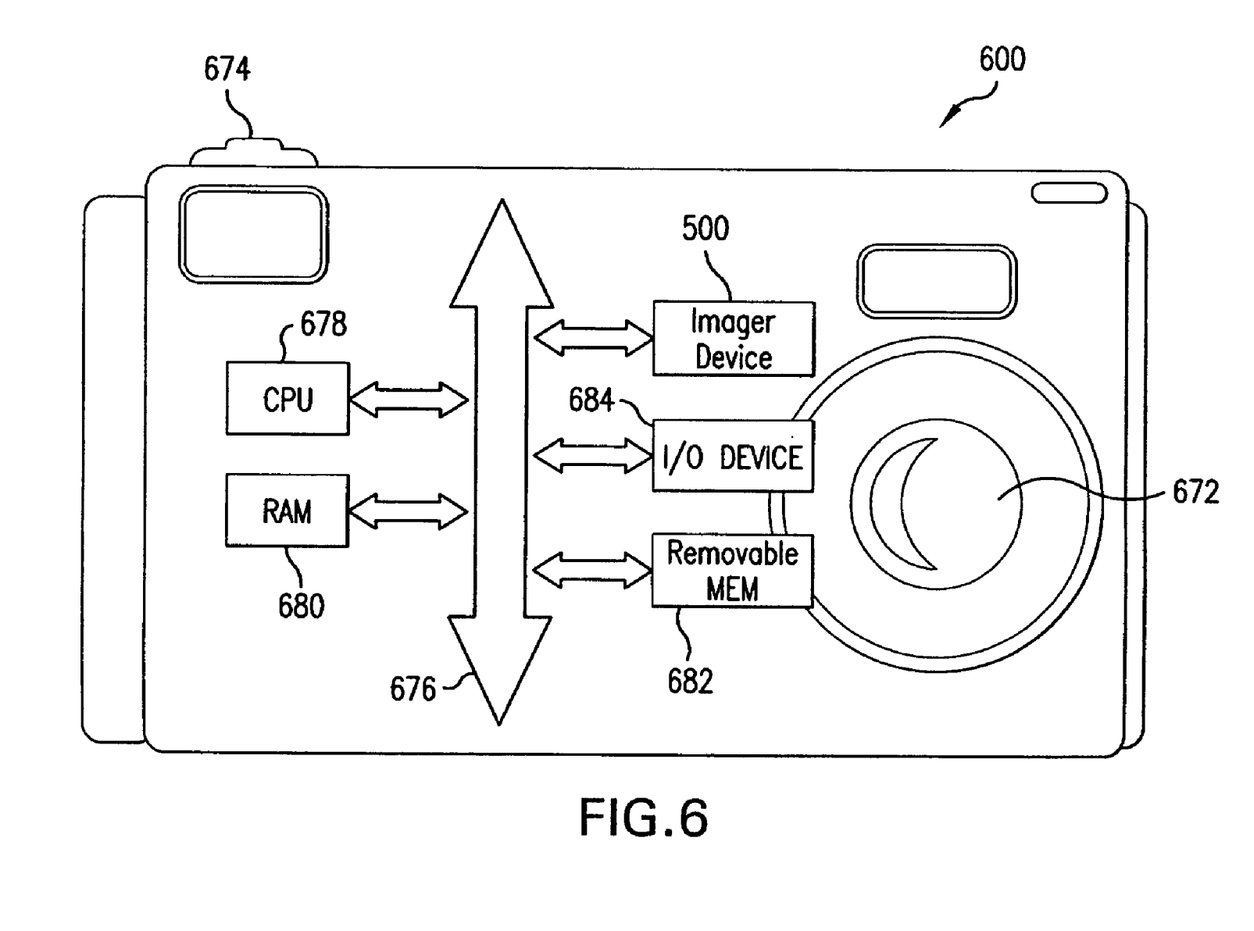
FIG. 6 is an illustration of a camera system having an imager device with a conditional pixel defect correction circuit, in accordance with an embodiment described herein.

Referring to FIG. 6, a typical imaging system 600 in which an imager device 500 employing conditional pixel defect correction is shown. System 600 is an example of an imaging system, for example, a still or video camera system, having digital circuits that could include an imager device 500. Without being limiting, such a system could include a computer system, camera system, scanner, machine vision, vehicle navigation system, video phone, surveillance system, auto focus system, star tracker system, motion detection system, image stabilization system, and other systems employing an imager device.

System 600 includes imager device 500 with conditional pixel defect correction circuit 220 (FIG. 5). System 600, when implemented as a still or video camera, also includes a lens element 662 for focusing an image onto the pixel array 510 of the imager device 500 to capture an image when a shutter release button 664 is pressed. System 600 generally comprises a central processing unit (CPU) 668, such as a microprocessor that controls camera functions and image flow, and communicates with an input/output (I/O) device 674 over a system bus 666. The imager device 500 also communicates with the CPU 668 over the bus 666. The system 600 also includes random access memory (RAM) 670, and can include removable memory 672, such as flash memory, which also communicates with the CPU 668 over the bus 666. In one embodiment, the imager device 500 may be combined with the CPU 668, with or without memory storage on a single integrated circuit or on a different chip than the CPU 668. The system 600 may also include a separate memory unit (not shown), which may perform some or all of the functions of the random access memory (RAM) 670.

The above described embodiments provide an apparatus for correcting defective pixel signals based on varying exposure conditions, and a method for determining conditional correction data for the apparatus. The above description and drawings illustrate embodiments which achieve the objects, features, and advantages described. Although certain advantages and embodiments have been described above, those skilled in the art will recognize that substitutions, additions, deletions, modifications and/or other changes may be made. For example, other exposure conditions may be tested and accounted for in the correction circuit, and additional correction schemes may be used. Also, imaging operating conditions, other than exposure conditions, which may produce defective pixels, and associated pixel signal corrections may also be used.

What is claimed as new and desired to be protected by Letters Patent of the United States is:

1. A method of operating an imager device comprising:
   with a plurality of pixels, capturing an image using an exposure condition;
   with the plurality of pixels, generating corresponding pixel signals;
   with a correction control circuit, receiving the pixel signals, pixel address signals associated with the plurality of pixels, and the exposure condition;
   with the correction control circuit, retrieving pixel correction information from memory, wherein the pixel correction information includes entries for each of the plurality of pixels, each entry including (1) a pixel address, (2) a condition selected from the group consisting of: a never repair condition, a conditional repair condition, and an always repair condition, and (3) a correction scheme;
   with the correction control circuit, determining how to correct each pixel using the pixel address for that pixel and the corresponding entry in the pixel correction information;
   in response to determining with the correction control circuit that the entry in the pixel correction information for a given pixel corresponds to the never repair condition, leaving the given pixel unrepaired by a pixel correction processor;
   in response to determining with the correction control circuit that the entry in the pixel correction information for the given pixel corresponds to the always repair condition, repairing the given pixel using the pixel correction processor and the correction scheme for that entry in the pixel correction information, wherein repairing the given pixel with the pixel correction processor using the correction scheme for that entry comprises performing correction actions that depend on the exposure condition; and
   in response to determining with the correction control circuit that the entry in the pixel correction information for the given pixel corresponds to the conditional repair condition, repairing the given pixel with the pixel correction processor using the correction scheme for that entry to produce a corrected pixel signal, wherein repairing the given pixel with the pixel correction processor using the correction scheme for that entry comprises performing correction actions that depend on the exposure condition.

2. The method defined in claim 1, wherein the exposure condition is an operating condition selected from the group consisting of:
   a level of lumination;
   a level of temperature; and
   an integration time.

3. The method defined in claim 1, wherein the exposure condition comprises a level of gain applied to the pixel signal.

4. The method defined in claim 1, further comprising:
   determining exposure conditions under which the plurality of pixels produce defective signals.

5. The method defined in claim 1, further comprising:
   testing the plurality of pixels under a plurality of exposure conditions; and
   under each of the exposure conditions tested, identifying which of the plurality of pixels produce defective signals.

6. The method defined in claim 5, further comprising:
   under each of the exposure conditions tested, identifying which of the plurality of pixels is part of a defective cluster.

7. The method defined in claim 1, further comprising:
   testing the plurality of pixels under a plurality of exposure conditions; and
   under each of the exposure conditions tested, identifying which of the plurality of pixels is part of a defective cluster.

8. The method defined in claim 1, wherein the memory comprises programmable memory.

9. The method defined in claim 1, wherein the memory comprises a non-volatile storage device.

10. The method defined in claim 9, wherein the non-volatile storage devices comprises at least one of a fuse bank and a flash drive.

11. The method defined in claim 1, wherein the imager device is part of an imaging system.

12. The method defined in claim 11, wherein the imaging system is a camera system.

13. The method defined in claim 1, wherein the pixels signals received by the correction control circuit comprise digital signals.

14. The method defined in claim 1, wherein the pixels signals received by the correction control circuit comprise analog signals.

* * * * *